US012654706B2

(12) United States Patent
    Camhi Espinoza et al.

(10) Patent No.:    US 12,654,706 B2
(45) Date of Patent:     Jun. 16, 2026

(54) SYSTEMS AND METHODS FOR DRIVER CONTROL AND AUTONOMOUS VEHICLE CONTROL AT INTERSECTIONS

(71) Applicant: Toyota Jidosha Kabushiki Kaisha, Toyota (JP)

(72) Inventors: Jaime S. Camhi Espinoza, Los Gatos, CA (US); Scott M. Harris, San Jose, CA (US); Michael L. Elkins, Framingham, MA (US); Daniel McCue, Roseville, CA (US); Sujeet Kashid, Santa Clara, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 292 days.

(21) Appl. No.: 18/428,589

(22) Filed: Jan. 31, 2024

(65) Prior Publication Data

US 2025/0242811 A1     Jul. 31, 2025

(51) Int. Cl.
    *B60W 30/18*       (2012.01)
    *B60W 50/16*       (2020.01)
    *B60W 60/00*       (2020.01)

(52) U.S. Cl.
    CPC ...... *B60W 30/18159* (2020.02); *B60W 50/16* (2013.01); *B60W 60/0015* (2020.02); *B60W 2520/10* (2013.01); *B60W 2540/229* (2020.02); *B60W 2555/60* (2020.02); *B60W 2556/40* (2020.02); *B60W 2556/45* (2020.02); *B60W 2720/106* (2013.01)

(58) Field of Classification Search
    CPC ....... B60W 30/18159; B60W 60/0015; B60W 50/16; B60W 2556/40; B60W 2556/45; B60W 2540/229; B60W 2555/60; B60W 2520/10; B60W 2720/106
    See application file for complete search history.

(56) References Cited

U.S. PATENT DOCUMENTS 11,332,132 B2   5/2022   Petroff et al.
2017/0285637 A1*   10/2017   Salinger ................ B60W 40/08
(Continued)

FOREIGN PATENT DOCUMENTS

| CN | 216053319 U | 3/2022 |
| CN | 116101324 A | 5/2023 |
| DE | 102021214751 A1 | 6/2023 |

*Primary Examiner* — Peter D Nolan
*Assistant Examiner* — Wae L Louie
(74) *Attorney, Agent, or Firm* — Dinsmore & Shohl LLP

(57) ABSTRACT

Embodiments disclosed herein are directed to a system for controlling a vehicle through an intersection. The system includes a server-computing device, a sensing system, and an electronic control unit that has a processing device and a memory device that stores logic, when executed by the at least one processing device, causes the electronic control unit to produce a rumble strip haptic feedback at a first zone prior to the intersection, slow the vehicle down at a predetermined deceleration rate when the sensing system indicates a driver is not paying attention, autonomously navigate the intersection if the driver is determined to be paying attention in a second zone when the driver was not paying attention in the first zone, the second zone is prior to the intersection, and autonomously stop the vehicle when the driver was not paying attention in the second zone after not paying attention in the first zone.

20 Claims, 9 Drawing Sheets

(56) References Cited

U.S. PATENT DOCUMENTS

| | | | | |
|---|---|---|---|---|
| 2020/0319644 | A1* | 10/2020 | Li | B60W 60/001 |
| 2021/0086772 | A1* | 3/2021 | Matsuura | B60W 50/14 |
| 2023/0134247 | A1* | 5/2023 | Willoughby | G01C 21/3415 |
| | | | | 701/41 |
| 2023/0138325 | A1* | 5/2023 | Willoughby | B60W 60/00274 |
| | | | | 701/26 |
| 2023/0138981 | A1* | 5/2023 | Willoughby | B60W 30/143 |
| | | | | 701/26 |
| 2023/0140569 | A1* | 5/2023 | Foster | B60W 30/146 |
| | | | | 701/400 |
| 2023/0256973 | A1* | 8/2023 | Misu | B60W 40/08 |
| | | | | 701/23 |
| 2023/0264697 | A1* | 8/2023 | Yasuda | B60K 35/235 |
| | | | | 340/576 |
| 2023/0294699 | A1* | 9/2023 | Liu | B60W 30/143 |
| | | | | 701/23 |
| 2023/0391366 | A1* | 12/2023 | Zheng | B60W 50/10 |
| 2024/0246479 | A1* | 7/2024 | Barrera | B60W 60/001 |
| 2025/0242811 | A1* | 7/2025 | Camhi Espinoza | B60W 50/16 |
| 2025/0356597 | A1* | 11/2025 | Elkins | G02B 27/0101 |

* cited by examiner

SYSTEMS AND METHODS FOR DRIVER CONTROL AND AUTONOMOUS VEHICLE CONTROL AT INTERSECTIONS

TECHNICAL FIELD

The present specification generally relates to systems and methods for autonomous vehicle control approaching intersections and, more specifically, to systems and methods for alerting the driver at approaching intersections.

BACKGROUND

Vehicles equipped with Society of Automotive Engineers (SAE) Level 2 autonomy must be monitored by the driver. Because crossing intersections through traffic is a more complex and risky part of driving, special rules such as requiring confirmation from the driver that they approve entering the intersection are often required. This is to ensure that the driver is paying attention so that the driver is prepared to manually avoid obstacles in the intersection if needed. Conventional systems utilize a stalk in the vehicle, which requires a driver to confirm by actuating the stalk. However, the driver can pull the stalk without really paying attention, which defeats the purpose of requiring the driver to confirm that driver is paying attention and ready to take manual control of the vehicle while traversing the intersection.

SUMMARY

In one embodiment, a system of controlling a vehicle through an intersection is provided. The system includes a server-computing device, a sensing system, and an electronic control unit. The server-computing device is configured to provide a map data to the vehicle indicative of positioning of the intersection. The electronic control unit is communicatively coupled to the sensing system. The electronic control unit has at least one processing device and a memory device coupled to the at least one processing device. The memory device stores logic that, when executed by the at least one processing device, causes the electronic control unit to produce a haptic feedback at a first zone prior to the intersection and slow the vehicle down at a predetermined deceleration rate when the sensing system indicates a driver is not paying attention, autonomously navigate the intersection if the driver is determined to be paying attention in a second zone when the driver was not paying attention in the first zone, the second zone is prior to the intersection, and autonomously stop the vehicle when the driver was not paying attention in the second zone after not paying attention in the first zone.

In another embodiment, a method of controlling a vehicle through an intersection is provided. The method includes determining a first zone prior to the intersection, determining a second zone positioned after the first zone and prior to the intersection, determining whether a driver is paying attention to the intersection when the vehicle is in the first zone, and in response to determining that the driver is not paying attention to the intersection when the vehicle is in the first zone, producing a haptic feedback and slowing the vehicle down at a predetermined deceleration rate in the second zone. The method continues by determining whether the driver is paying attention to the intersection following the haptic feedback, autonomously stop the vehicle when the driver was not paying attention in the second zone after not paying attention in the first zone, and autonomously navigate the intersection when the driver is determined to be paying attention in the second zone when the driver was not paying attention in the first zone.

In yet another embodiment, an autonomous vehicle includes a sensing system and an electronic control unit. The electronic control unit is communicatively coupled to the sensing system. The electronic control unit has at least one processing device and a memory device coupled to the at least one processing device. The memory device stores logic that, when executed by the at least one processing device, causes the electronic control unit to determine a first zone prior to an intersection, determine a second zone positioned after the first zone and prior to the intersection, determine whether a driver is driver is paying attention to the intersection, in response to the determination that the driver is not paying attention, produce a haptic feedback at the first zone prior to the intersection and slow the autonomous vehicle down at a predetermined deceleration rate, determine whether the driver is now paying attention to the intersection, autonomously navigate the intersection if the driver is determined to now be paying attention in the second zone when the driver was not paying attention in the first zone, and autonomously stop the autonomous vehicle when the driver was not paying attention in the second zone after not paying attention in the first zone.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally directed to an autonomous vehicle that includes an intersection driver awareness system configured to provide haptic feedback to a driver at certain periods prior to the vehicle entering the intersection. Example haptic feedback include vibrating the steering wheel or seat in a predetermined pattern, such as a pattern that mimics rumble strips typically found on roads to alert drivers. The haptic feedback is to ensure alert the driver of the upcoming intersection and the intersection driver awareness system further utilizes a sensing system to determine whether the driver is paying attention to the intersection at the certain zones (e.g., a pre-haptic zone and a post-haptic zone) in advance of the intersection. The placement of the zones may be based on the current speed of the vehicle and the distance to the upcoming intersection. In one example, facial monitoring sensors may be used to gather data of the driver for a determination whether the driver is paying attention. If the driver is not paying attention, a haptic feedback may be initiated and the vehicle may be automatically slowed down at a predetermined deceleration rate, which is at enough of a deceleration rate to prompt the driver to pay attention, but not enough to cause discomfort for the driver or create issues for vehicles trailing the vehicle.

In the post-haptic zone, which is subsequent to the pre-haptic zone, another determination may be made whether the driver is now paying attention when the driver was not paying attention in the pre-haptic zone, after feeling the effects of the haptic feedback. This post-haptic zone allows the driver to recover following the pre-haptic zone. When the driver recovers (i.e., the intersection driver awareness system determines that the driver is now paying attention), the vehicle autonomously travels through the intersection at a slower speed. However, if the intersection driver awareness system determines that the driver is still not paying attention, the vehicle autonomously stops prior to the intersection and requires manual intervention to proceed through the intersection.

The phrase "communicatively coupled" is used herein to describe the interconnectivity of various components of the intersection driver awareness system for providing haptic feedback to the driver and determining whether the driver is paying attention to the upcoming intersection before the vehicle autonomously navigates the intersection and means that the components are connected either through wires, optical fibers, or wirelessly such that electrical, optical, and/or electromagnetic signals may be exchanged between the components. It should be understood that other means of connecting the various components of the system not specifically described herein are included without departing from the scope of the present disclosure.

Figure 1:
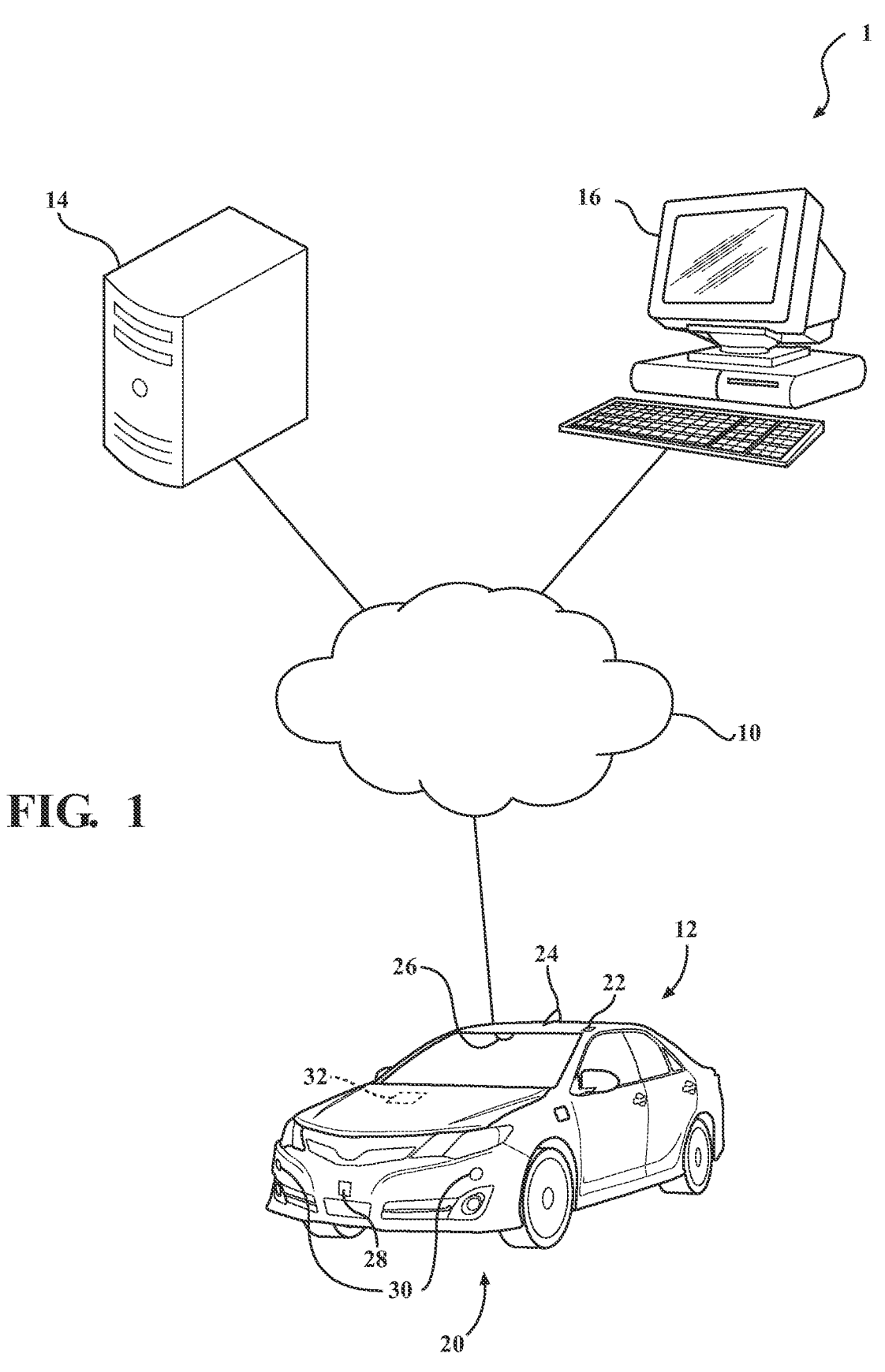
FIG. 1 schematically depicts an illustrative network having components for an intersection driver awareness system according to one or more embodiments shown or described herein.

Referring now to the drawings, FIG. 1 depicts an illustrative network having components for an intersection driver awareness system 1 according to embodiments shown and described herein. As illustrated in FIG. 1, a computer network 10 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 10 may generally be configured to electronically connect one or more devices such as computing devices and/or components thereof. Illustrative devices may include, but are not limited to, a vehicle 12, server-computing device 14, and a user-computing device 16.

The vehicle 12 may generally be any vehicle with one or more onboard computing devices, particularly computing devices that contain hardware for processing data, storing data, receiving data, and transmitting data such as data of an approaching intersection and whether a driver is aware or paying attention to the upcoming intersection with respect to the traveling the vehicle 12. Thus, the vehicle 12 and/or components thereof may perform one or more computing functions, such as determining that there is an upcoming intersection, determining an awareness of the driver, determining a current speed of the vehicle, determining a distance to the upcoming intersection, and/or the like. Further, the vehicle 12 and/or components thereof may perform one or more computing functions, such as controlling a haptic feedback, controlling a speed of the vehicle, controlling a braking rate, and/or the like, as described in greater detail herein.

The vehicle 12 may generally include a sensing system 20. The sensing system 20 may include at least one sensor 30 configured for external sensing such as scanning an environment for intersections, an antenna 24, an image-capturing device 26, a global positioning systems (GPS) device 22, a vehicle condition sensor 28 configured to detect a plurality of current vehicle conditions, and/or the like. Further, the vehicle 12 may include an electronic control unit 32, as discussed in greater detail herein.

The user-computing device 16 may generally be used as an interface between a user and the other components connected to the computer network 10. Thus, the user-computing device 16 may be used to perform one or more user-interfacing functions, such as receiving one or more inputs from a user or providing information to the user, as described in greater detail herein. Accordingly, the user-computing device 16 may include at least a display and/or input hardware, as described in greater detail herein. In the event that the server-computing device 14 requires over-sight, updating, and/or correction, the user-computing device 16 may be configured to provide the desired over-sight, updating, and/or correction. The user-computing device 16 may also be used to input additional data into a corpus of data stored on the server-computing device 14. For example, the user-computing device 16 may contain soft-ware programming, or the like, that relates to navigation, maps data, speeds of vehicles, and the like.

The server-computing device 14 may receive data from one or more sources, generate data, store data, index data, search data, and/or provide data to the user-computing device 16 and/or the vehicle 12 (or components thereof). In some embodiments, the server-computing device 14 may employ one or more algorithms that are used for the pur-poses of analyzing data related to the intersection driver awareness system 1, such as approaching intersections, whether the intersection is identified by a traffic control device (e.g., traffic light, yield sign, stop sign, and the like), and the like, as described in greater detail herein. Moreover, the server-computing device 14 may be used to produce data, such as establishing thresholds for the intersection driver awareness system 1 to prepare the driver based on the current speed of the vehicle and the distance to the upcoming intersection, the amount of deceleration required to stop the vehicle prior to the intersection should the driver not be aware of the upcoming intersection after receiving haptic feedback, and the like, as described in greater detail herein. It should be appreciated that the vehicle on board computing systems may function with the server-computing device such that the vehicle and the on board computing systems may perform the functions of the server-computing device 14 and vice versa, as discussed in greater detail herein.

It should be understood that while the user-computing device 16 is depicted as a personal computer and the server-computing device 14 is depicted as a server, these are non-limiting examples. In some embodiments, any type of computing device (e.g., mobile computing device, personal computer, server, etc.) may be used for any of these com-ponents. Additionally, while each of these computing devices is illustrated in FIG. 1 as a single piece of hardware, this is also merely an example. Each of the user-computing device 16 and the server-computing device 14 may represent a plurality of computers, servers, databases, components, and/or the like, that may or may not be components of the vehicle 12.

Figure 2:
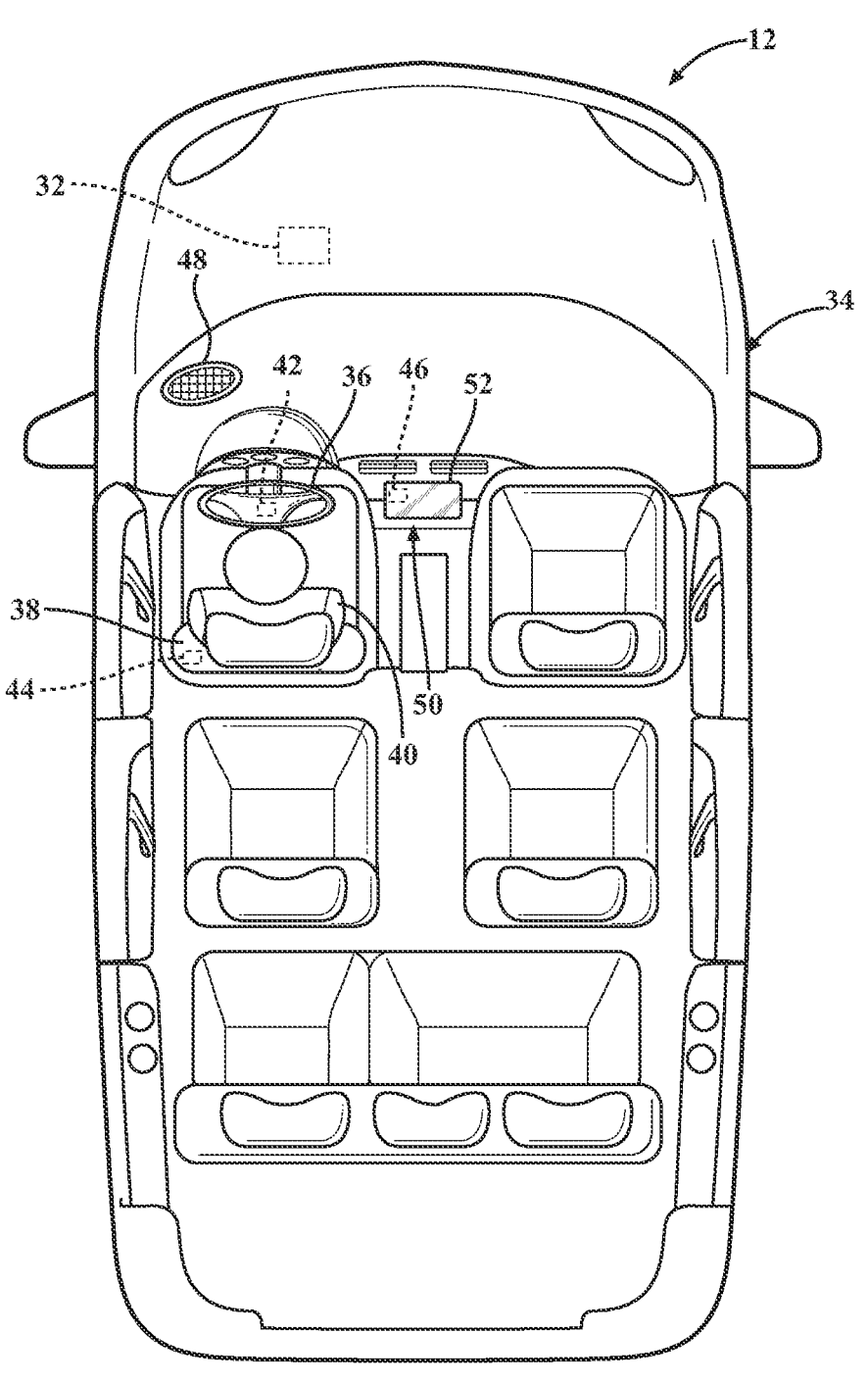
FIG. 2 schematically depicts a top down view of the vehicle of FIG. 1 including components of the intersection driver awareness system according to one or more embodiments shown and described herein.

FIG. 2 schematically depicts a top down view of the vehicle 12 illustrating a partial environmental view of a passenger compartment 34 of the vehicle 12. It should be understood that the vehicle 12 includes a vehicle body onto which a vehicle drivetrain is coupled and the passenger compartment 34 is integral with the vehicle body. The passenger compartment 34 generally defines a passenger cabin of the vehicle 12. The vehicle 12 may further include a steering wheel 36, a driver seat 38 and a driver 40. Other seats may be present in the passenger compartment 34. Further, the steering wheel 36 may include an actuator 42 configured to vibrate or otherwise shake the steering wheel 36 as a haptic feedback in a predetermined pattern. Option-ally, the driver seat 38 may include an actuator 44 configured to vibrate or otherwise shake the driver seat 38 as a haptic feedback in a predetermined pattern. The predetermined pattern generated or produced by the actuator 42 and/or the actuator 44 as the haptic feedback may be similar to or mimic traversing rumble strips (e.g., uniformly spaced apart vibrations for a predetermined durations that may be in sets where the timing between the spaced apart vibrations may speed up or slow down based on the diver condition).

That is, it should be appreciated that the haptic feedback may be in the form of vibrating the steering wheel 36 or the driver seat 38 in a pattern that mimics traversing rumble strips, which are features on a road that, when driven over, produce certain patterns of vibration designed to capture an attention of the driver and direct the driver to the reality of leaving a lane or approaching an area where they should pay more attention and slow down or stop (transversal rumble strips). As such, the embodiments disclosed herein produce the haptic feedback that is similar to be suggestive of driving over rumble strips (such as driving over or transversal to the rumble strips) to give the driver the same effect of drawing their attention to the need to pay more attention and/or slow down.

The vehicle 12 may generally be any vehicle (e.g., motor vehicle, hybrid, recreational, partial autonomous, off-road, boat, airplane, autonomous, and/or the like) that includes or is capable of being communicatively coupled to the inter-section driver awareness system 1 and one or more vehicle onboard computing devices, such as an electronic control unit 32 that contains hardware for processing data, storing data, displaying data, and detecting operating conditions of the vehicle 12, as discussed in greater detail herein. Thus, the intersection driver awareness system 1 and/or components thereof may perform one or more computing functions, such as determining the current position of the vehicle 12, whether there is an approaching intersection, the current speed of the vehicle 12, the distance to the upcoming intersection, whether the driver is aware and paying atten-tion to the upcoming intersection, and the like, as discussed in greater detail herein. Further, the intersection driver awareness system 1 may provide autonomous control of the vehicle 12 dependent on the driver awareness with respect to the upcoming intersection.

In other embodiments, the vehicle 12 may further include an audio system 46 that includes at least one speaker 48. The audio system 46 may be communicatively coupled to the electronic control unit 32 and may be configured to provide an audio feedback to the driver 40 in the similar manner as the haptic feedback as discussed in greater detail herein. As such, when it is determined that the driver 40 is not paying attention or not aware of the upcoming intersection, the audio system 46 may provide an audio feedback via the at least one speaker 48. In some embodiments, the audio feedback may be independent from the haptic feedback discussed above. In other embodiments, the audio feedback and the haptic feedback may be used in combination or simultaneously.

In other embodiments, the vehicle 12 may further include a display device 50 that includes a display portion 52. The display device 50 may be communicatively coupled to the electronic control unit 32 and may be configured to provide a visual feedback to the driver 40 in the similar manner as the haptic feedback as discussed in greater detail herein. As such, when it is determined that the driver 40 is not paying attention or not aware of the upcoming intersection, the display device 50 may provide a visual feedback via the display portion 52. In some embodiments, the visual feedback may be independent from the haptic feedback and/or the audio feedback discussed above. In other embodiments, the visual feedback, the audio feedback, and/or the haptic feedback may be used in combination or simultaneously.

Figure 3A:
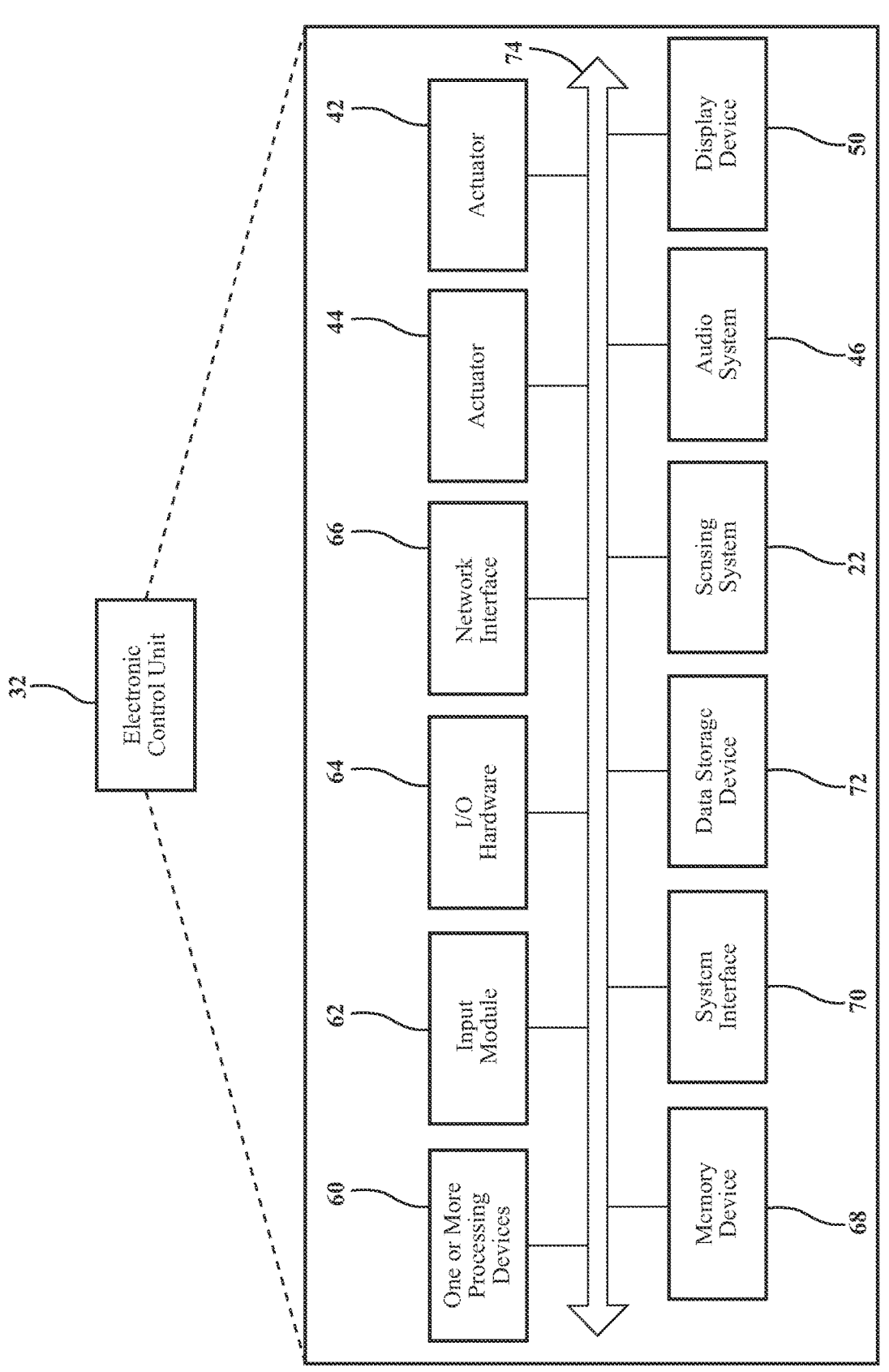
FIG. 3A schematically depicts illustrative hardware components of an electronic control unit that may be used in the intersection driver awareness system according to one or more embodiments shown and described herein.

FIG. 3A schematically depicts illustrative hardware components of the vehicle 12 that may be used in the intersection driver awareness system 1. While the components depicted in FIG. 3A are described with respect to the vehicle 12, it should be understood that similar components may also be used for the user-computing device 16 (FIG. 1) and/or the server-computing device 14 (FIG. 1) without departing from the scope of the present disclosure.

The vehicle 12 may include the electronic control unit 32 having a non-transitory computer-readable medium for completing the various processes described herein, embodied as hardware, software, and/or firmware, according to embodiments shown and described herein. While in some embodiments the electronic control unit 32 may be configured as a general purpose computer with the requisite hardware, software, and/or firmware, in other embodiments, the electronic control unit 32 may also be configured as a special purpose computer designed specifically for performing the functionality described herein. For example, the electronic control unit 32 may be a device that is particularly adapted to automatically adjust the speed of the vehicle to control the vehicle 12 from entering the upcoming intersection when the driver is determined to not be paying attention in any of the predetermined zones in advance of the upcoming intersection. In another example, the electronic control unit 32 may be a device that is particularly adapted to utilize the sensing system 20 of the vehicle 12 for the purposes of monitoring the vehicle conditions, monitoring for upcoming intersections, monitoring for traffic devices and the status of those (e.g., a green light in a traffic light), and determining an awareness of the driver 40. In embodiments where the electronic control unit 32 is a general purpose computer, the systems and methods described herein provide a mechanism for improving computer functionality by providing an autonomous control of the vehicle to inhibit the vehicle 12 from entering the upcoming intersection when the driver 40 is determined to not meet a predetermined threshold of awareness after provide the haptic feedback to the driver to alert the driver of the upcoming intersection.

Still referring to FIG. 3A, the electronic control unit 32 may generally be an onboard vehicle computing system. In some embodiments, the electronic control unit 32 may be a plurality of vehicle computing systems.

As also illustrated in FIG. 3A, the electronic control unit 32 may include one or more processing devices 60, an input module 62, an I/O hardware 64, a network interface hardware 66, a non-transitory memory device 68, a system interface 70, and the data storage device 72. The sensing system 20, the actuator 42, the actuator 44, the audio system 46, and/or the display device 50 may be part of the electronic control unit 32 and/or may be communicatively coupled to the various components of the electronic control unit 32. A local interface 74, such as a bus or the like, may interconnect the various components including, without limitation the sensing system 20, the actuator 42, the actuator 44, the audio system 46, and/or the display device 50.

The one or more processing devices 60, such as a computer-processing unit (CPU), may be the central processing unit of the electronic control unit 32, perform calculations and logic operations to execute a program. The one or more processing devices 60, alone or in conjunction with the other components, is an illustrative processing device, computing device, or combination thereof. The one or more processing devices 60 may include any processing component configured to receive and execute instructions (such as from the data storage device 72 and/or the memory device 68).

The memory device 68 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory device 68 may include one or more programming instructions thereon that, when executed by the one or more processing devices 60, cause the one or more processing devices 60 to complete various processes, such as the processes described herein with respect to FIG. 4. Still referring to FIG. 3A, the programming instructions stored on the memory device 68 may be embodied as a plurality of software logic modules, where each logic module provides programming instructions for completing one or more tasks, as described in greater detail below with respect to FIG. 3B.

The network interface hardware 66 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 66 may provide a communications link between the vehicle 12 and the other components of the intersection driver awareness system 1 depicted in FIG. 1, including (but not limited to) the server-computing device 14.

Still referring to FIG. 3A, the data storage device 72, which may generally be a storage medium, may contain one or more data repositories for storing data that is received and/or generated. The data storage device 72 may be any physical storage medium, including, but not limited to, a hard disk drive (HDD), memory, removable storage, and/or the like. While the data storage device 72 is depicted as a local device, it should be understood that the data storage device 72 may be a remote storage device, such as, for example, a server-computing device or the like (e.g., the server-computing device 14 of FIG. 1). Illustrative data that may be contained within the data storage device 72 is described below with respect to FIG. 3C.

Still referring to FIG. 3A, the input module 62 may include tactile input hardware (i.e. a joystick, a knob, a lever, a button, etc.) that allows the vehicle occupant to input settings such as feedback preference for the intersection driver awareness system 1 (FIG. 1), sensitivity or a range for the components of the sensing system 20 (i.e. the at least one sensor 30, the vehicle condition sensor 28, and/or the like), and/or the like. In some embodiments, a button or other electrically coupled input device may be disposed within the vehicle 12 and may be communicatively coupled to the intersection driver awareness system 1 (FIG. 1) such that when the button or other input device is activated (i.e., touched, moved, etc.), the one or more processing devices 60 executes logic stored on the memory device 68 to activate the intersection driver awareness system 1. It should be appreciated that the input device may be a keyboard, a mouse, a joystick, a touch screen, a remote control, a pointing device, a video input device, an audio input device, a haptic feedback device, and/or the like. In other embodiments, the input module 62 may include components of the vehicle 12, such as a stalk, an accelerator pedal, a brake pedal, a button, and/or the like, that the driver 40 (FIG. 2) may actuate to indicate as a mechanical verification of awareness of the upcoming intersection, as discussed in greater detail herein.

The I/O hardware 64 may communicate information between the local interface 74 and one or more other components of the vehicle 12. For example, the I/O hardware 64 may act as an interface between the electronic control unit 32 and other components, such as the global positioning systems (GPS) device 22, other navigation systems, meter units, mobile phone systems, infotainment systems, the sensing system 20, the actuator 42, the actuator 44, the audio system 46, and/or the display device 50, and/or the like. In some embodiments, the I/O hardware 64 may be utilized to transmit one or more commands to the other components of the vehicle 12 and/or receive one or more commands from other components of the vehicle 12.

The network interface hardware 66 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 66 may provide a communications link between the vehicle 12 and the other components of the intersection driver awareness system 1 depicted in FIG. 1, including (but not limited to) the server-computing device 14.

The system interface 70 may generally provide the electronic control unit 32 with an ability to interface with one or more external devices such as, for example, the user-computing device 16 and/or the server-computing device 14 depicted in FIG. 1. Communication with external devices may occur using various communication ports (not shown). An illustrative communication port may be attached to a communications network.

The sensing system 20 may be communicatively coupled to the local interface 74 and coupled to the one or more processing devices 60 via the local interface 74. The sensing system 20 may permit data gathered from the at least one sensor 30, the antenna 24, the image-capturing device 26, the GPS device 22, the vehicle condition sensor 28, and/or the like to be communicated to the one or more processing devices 60. The at least one sensor 30 may be configured for light detecting and ranging sensing (LIDAR), a radio detection and ranging sensing (RADAR), a sound navigation and ranging sensing (SONAR), and/or the like. Further, the at least one sensor 30 may be any device, sensor, detector, and/or the like suitable or configured for external sensing to intersections, traffic control device, current signaling (e.g., whether there is a green, yellow, or red light), and/or the like. The antenna 24 may be any device configured to work with global positioning systems (GPS), the server-computing device 14 to receive map data, and/or other components to receive and/or transmit data within the intersection driver awareness system 1 (FIG. 1). As such, the antenna 24 may be used with the GPS device 22, the at least the network interface 66, other navigation systems, and/or the like. As such, the antenna 24 may be suitable for receiving and transmitting signals, such as GPS signals or signals generated by the server-computing device 14, the user-computing device 16, and/or the vehicle 12 (components thereof).

The image-capturing device 26 may be any device, sensor, or detector that is suitable for obtaining images. That is, the image-capturing device 26 may incorporate one or more image sensors, one or more image processors, one or more optical elements, and/or the like. In some embodiments, the image-capturing device 26 may capture high dynamic range (HDR) images. In some embodiments, the image-capturing device 26 may capture a plurality of images successively (e.g., "burst mode" capture), may capture single images at particular intervals, and/or may capture motion images (e.g., video capture). That is, as used herein, the term "images" or "image" refers to video images (i.e., a sequence of consecutive images), still images (including still images isolated from video images), and/or image data.

In some embodiments, images are continuously captured and analyzed. In other embodiments, images are captured at particular intervals such as when an upcoming intersection is determined. Other example illustrative intervals may include, but are not limited to, time intervals such as every second, every 2 seconds, every 3 seconds, every 4 seconds, every minute, every 2 minutes, every 5 minutes, every 30 minutes, every hour, or the like. In addition to capturing images, the image-capturing device 26 may record information regarding the image capture, such as, for example, a time stamp of when the image was captured, a frame rate, a field of view, and/or the like. Each captured image and the recorded information may be transmitted as image data to the electronic control unit 32.

In some embodiments, the image-capturing device 26 may be capable of focusing on a target object, zooming in and out, and/or moving, such as, for example, panning, tilting, and/or the like. In some embodiments, the image-capturing device 26 may be capable of tracking a moving object, such as, for example, the eyes or head of the driver 40, facial expressions of the driver 40, and/or the like. As such, the image-capturing device 26 may incorporate various motion sensing and/or tracking components, software, and/or the like that are generally understood as providing tracking capabilities. In some embodiments, movement of the image-capturing device 26 may be remotely controlled by a user, by the server-computing device 14 and/or the user-computing device 16.

Further, the image-capturing device 26 may include or may be coupled to a lens. The lens is not limited by this disclosure and may generally be any optical component that is configured to focus the light entering the image-capturing device 26 such that an image can be properly obtained. In some embodiments, the lens may be a fixed lens that is not adjustable. In other embodiments, the lens may be adjustable, either manually or automatically by the electronic control unit 32 of the vehicle 12, to zoom in on an object, zoom out on an object, such as the driver 40, and/or adjust the focus of the light entering the image-capturing device 26.

Any suitable commercially available image-capturing device 26 may be used without departing from the scope of the present disclosure. In some embodiments, the image-capturing device 26 may also be coupled to one or more other components that provide additional functionality for imaging, such as, for example, one or more sensors.

Further, while FIG. 1 depicts the image-capturing device 26 as a single device, there may be more than one image-capturing device. As such, it should be understood that any number of image capturing devices may be used without departing from the scope of the present disclosure. For example, the image-capturing device 26 may be a plurality of imaging devices arranged to capture an image in tandem, such as, for example, to capture a larger field of view than what would be possible with a single image-capturing device or to capture a plurality of different angles of the same field of view.

In some aspects, it should be understood that the image-capturing device 26 may also be a sensor positioned within the vehicle 12 and configured to sense a gaze of the driver 40. For example, the image-capturing device 26 may be positioned within, integrally formed with (as a monolithic single structure), or coupled to the rear view mirror, or portions thereof. In other aspects, the image-capturing device 26 may be positioned anywhere in the vehicle 12 to sense a gaze of the driver, such as without limitation, the windshield, the instrument panel, the steering wheel 36, an interior roof surface, and the like.

Further, in this aspect, the sensor (e.g., the image-capturing device 26) configured to determine the gaze of the driver 40 is not limited by this disclosure, and may generally be any device that captures images, detects eye gaze of the driver, and/or the like, and transmits the obtained gaze data to the electronic control unit 32. Any suitable commercially available gaze sensor may be used without departing from the scope of the present disclosure. In this aspect, the sensor (e.g., the image-capturing device 26) may be configured to determine the gaze of the driver 40 may generally be used to sense the movement or gaze of the eyes and/or pupils of the driver 40 of the vehicle 12 so as to provide feedback during operation of whether the driver 40 is aware of the upcoming intersection and is prepared for manual control of the vehicle 12.

As such, the image-capturing device 26 may be configured to capture images of the driver 40 for gaze determination, for facial monitoring determinations, and the like, to determine an awareness of the driver 40. Further, the image-capturing device 26 may also be the sensor configured to determine the gaze of the driver. The data obtained by the image-capturing device 26 may be transmitted as a plurality of outputs, either wired or wirelessly, to the electronic control unit 32, as explained in greater detail herein. As such, the transmitted data may be analyzed by the electronic control unit 32 to determine whether the facial monitoring are indicative of the driver 40 meeting a predetermined awareness for autonomous navigation of the upcoming intersection or whether the driver 40 will need to perform a manual takeover of vehicle control of the vehicle 12 in to transverse the upcoming intersection. For example, the driver 40 may move his or her gaze up or down as is looking at a personal electronic device, which would indicate the driver is not aware or prepared to take manual control of the vehicle 12. In other embodiments, the image-capturing device 26 may not be an image-capturing device, but may be a laser-based sensor, a proximity sensor, a level detection sensor, a pressure sensor, any combination thereof, and/or any other type of sensor that one skilled in the art may appreciate.

The electronic control unit 32 may be configured to receive the image data from the image-capturing device 26 to determine the facial monitoring of the driver 40 such as the gaze of the driver 40. As such, the electronic control unit 32 may be configured to process the image data to determine whether the driver 40 is aware and/or prepared for manual takeover at predetermined intervals in advance of the upcoming intersection, as discussed in greater detail herein.

The vehicle condition sensor 28 may be configured to detect a plurality of real-time vehicle conditions. The plurality of vehicle conditions may include detecting a current vehicle speed, whether the vehicle 12 is accelerating, decelerating, maintaining a constant speed, and the like. In some embodiments, the at least one sensor 30, the antenna 24, the GPS device 22, the vehicle condition sensor 28, and/or the image-capturing device 26 may be coupled to one or more other components that provide additional functionality, such as, for example, one or more sensors.

Figures 3B, 3C:
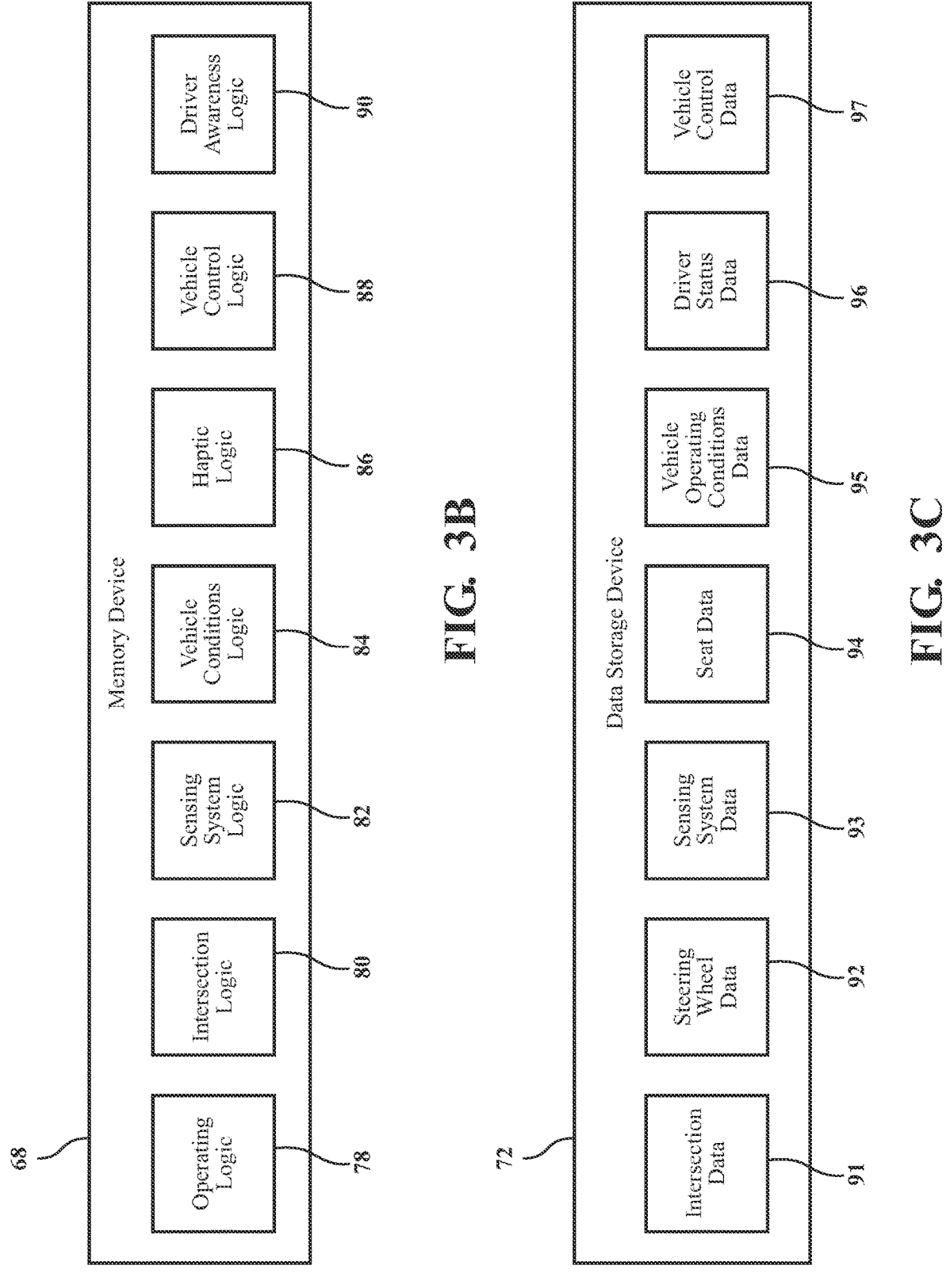
FIG. 3B schematically depicts an illustrative memory component containing illustrative logic components according to one or more embodiments shown and described herein.
FIG. 3C schematically depicts an illustrative data storage device containing illustrative data components according to one or more embodiments shown and described herein.

With reference to FIG. 3B, in some embodiments, the program instructions contained on the memory device 68 may be embodied as a plurality of software modules, where each module provides programming instructions for completing one or more tasks. For example, FIG. 3B schematically depicts the memory device 68 containing illustrative logic components according to one or more embodiments shown and described herein. As shown in FIG. 3B, the memory device 68 may be configured to store various processing logic, such as, for example, operating logic 78, intersection logic 80, sensing system logic 82, vehicle conditions logic 84, haptic logic 86, vehicle control logic 88, and/or driver awareness logic 90 (each of which may be embodied as a computer program, firmware, or hardware, as an example). The operating logic 78 may include an operating system and/or other software for managing components of the electronic control unit 32 (FIG. 3A). Further, the operating logic 78 may contain one or more software modules for generating data, transmitting data, and/or analyzing data.

Still referring to FIG. 3B, the intersection logic 80 may contain one or more software modules for collecting data from one or more sources (e.g. the sensing system 20, the GPS device 22, the server-computing device 14 as depicted in FIG. 1, and/or the like) for determining whether there is an upcoming intersection, the traffic control device at that intersection, if the traffic control device is a traffic light and which color is the traffic light (e.g., green light, yellow light, red light), distance to the upcoming intersection, and the like, as described in greater detail herein. Further, the intersection logic 80 may determine various virtual zones prior to the intersection, such as, without limitation, a pre-haptic zone and a post-haptic zone, each virtually positioned prior to the intersection based on distance to the intersection and current vehicle condition such as speed, such that the vehicle may be stopped before the intersection when the driver is not alert or paying attention to the upcoming intersection.

The sensing system logic 82 may contain one or more software modules for gathering sensing data (e.g., from the at least one sensor 30, the antenna 24, the image-capturing device 26, the global positioning systems (GPS) device 22, and/or the like), instruct devices when to activate or deactivate (e.g., from the at least one sensor 30, the antenna 24, the image-capturing device 26, the global positioning systems (GPS) device 22, and/or the like), and the like. As such, the sensing system logic 82 may work in combination with other logic processing logic of the memory device 68 such as, without limitation, the intersection logic 80.

The vehicle conditions logic 84 may contain one or more software modules for collecting data from one or more sources of the vehicle 12 (e.g. the vehicle condition sensor 28, other components of the sensing system 20, as depicted in FIG. 1, and/or the like) to gather data relating to the current operating conditions of the vehicle 12. As such, the vehicle conditions logic 84 may work in combination with other logic processing logic of the memory device 68 such as, without limitation, the intersection logic 80, the sensing system logic 82, and the like. Further, in some embodiments, the vehicle conditions logic 84 may further contain one or more software modules for collecting data from an actuation of components of the vehicle 12 (FIG. 1) such as a stalk, an accelerator pedal, a brake pedal, a button, or other input (e.g., from the input module 62 depicted in FIG. 3A) that may be actuated by the driver 40 (FIG. 2) to indicate a secondary, confirmation awareness of the upcoming intersection following a determination of non-awareness of the upcoming intersection, as discussed in greater detail herein.

The haptic logic 86 may contain one or more software modules for activating various haptic feedback devices such as, without limitation, the actuator 42, the actuator 44, the audio system 46, and/or the display device 50, and/or the like. The activation of such devices by the one or more software modules of the haptic logic 86 may be to generate various haptic feedbacks in predetermined patterns such as actuating the actuator 42 and/or the actuator 44 in a pattern to mimic traversing rumble strips, the audio system 46 by changing a volume (e.g., increasing or decreasing the volume) playing beeps or other alert tones, and the like, and/or the display device 50 by changing displays or other ways of getting the attention of the driver 40 for the upcoming intersection.

The vehicle control logic 88 may contain one or more software modules for decelerating the vehicle 12 at the predetermined deceleration rate, which may be based on the current vehicle speed, the distance to the upcoming intersection, and the like, permitting the vehicle to proceed in autonomous mode through the intersection, inhibit the vehicle from traveling through the intersection, and/or the like.

The driver awareness logic 90 may contain one or more software modules for analyzing data gathered from various devices (e.g., components of the sensing system 20, such as the image-capturing device 26, and the like) to determine whether the driver is alert and/or aware in the various zones (e.g., the pre-haptic zone and/or the post-haptic zone) prior to the upcoming intersection such that the vehicle 12 (FIG. 2) may autonomously travel through the intersection when the determination is that the driver 40 (FIG. 2) is paying attention or the vehicle 12 (FIG. 2) is autonomously prohibited or stopped from traveling through the intersection when the driver 40 (FIG. 2) is determined to not be paying attention and prepared for manual takeover, as discussed in greater detail herein. The driver awareness logic 90 may analyze newly gathered data to make the driver awareness determination solely based on the new data, or may compare known driver data, such as known data when the driver 40 (FIG. 2) is unaware or not paying attention (e.g., below an acceptance threshold), to newly gathered or newly analyzed data to make the driver awareness determination. Further, the driver awareness logic 90 may work in combination with the vehicle conditions logic 84 for collecting data from components of the vehicle 12 (FIG. 1) such as actuation of the stalk, the accelerator pedal, the brake pedal, the button, and/or other input (e.g., from the input module 62 depicted in FIG. 3A) that may be actuated by the driver 40 (FIG. 2) to confirm and/or indicate that the driver is now focused on the upcoming intersection following a determination of non-awareness of the upcoming intersection, as discussed in greater detail herein.

FIG. 3C schematically depicts a block diagram of various data contained within a storage device (e.g., the data storage device 72). As shown in FIG. 3C, the data storage device 72 may include, for example, intersection data 91, steering wheel data 92, sensing system data 93, seat data 94, vehicle operating conditions data 95, driver status data 96, and vehicle control data 97. The intersection data 91 may include data relating to the type of intersection (e.g., two-way, three-way, four way, and the like), the traffic control device (e.g., traffic light, stop sign, color of the traffic light (e.g., green light, yellow light, red light), yield sign, no device, and/or the like), the position of the pre-haptic zone and the position of the post-haptic zone, the distance to the upcoming intersection and the like.

The steering wheel data 92 may include data regarding the type of steering wheel, driver settings of the steering wheel, a type of the actuator 44, positioning of the actuator 44, communication data with the actuator 44, and/or the like.

The sensing system data 93 may store data from the various devices of the sensing system 20 such as the at least one sensor 30, the antenna 24, the image-capturing device 26, the global positioning systems (GPS) device 22, and/or the like. Example data may include vehicle positioning data, map data (e.g., data provided by the server-computing device 14 (FIG. 1)), environment data (e.g., weather data, obstacle data, other vehicles data, intersection data), driver data, and the like. The seat data 94 may include data regarding the type of seat, driver settings of the seat, a type of the actuator 44, position of the actuator 44 (e.g., seat back, head rest, seat bottom, and the like) communication data with the actuator 44, and/or the like.

The vehicle operating conditions data 95 may include data relating to the current, real time data of the vehicle such as GPS data, the current speed data of the vehicle 12 (FIG. 1), vehicle positioning data, map data (e.g., data provided by the server-computing device 14 (FIG. 1)), and/or any other data relating generally to the vehicle 12 (FIG. 1) and/or operating conditions of the vehicle 12 (FIG. 1). The driver status data 96 may include data relating to gaze data, facial monitoring data, and the like of the driver. Further, the driver status data 96 may include data related to whether the driver 40 (FIG. 2) is aware and paying attention to the upcoming intersection or whether the driver 40 (FIG. 2) is not paying attention or unaware of the upcoming intersection. The driver status data 96 may include data in these known conditions (aware or unaware) for comparison purposes by, for example, the driver awareness logic 90, as discussed in greater detail herein. Example data of diver awareness may include data relating to the sensing systems 20 and/or may include data related to whether the driver 40 (FIG. 2) actuated the stalk, the accelerator pedal, the brake pedal, the button, and/or other input (e.g., from the input module 62 depicted in FIG. 3A) at a predetermined time to indicate awareness a d confirmation of alertness to the upcoming intersection, as discussed in greater detail herein.

The vehicle control data 97 may include data relating to the actual physical control of the vehicle 12 such as data relating to the predetermined deceleration rate based on the current speed of the vehicle 12 and the distance to the upcoming intersection, as discussed in greater detail herein. Further, the vehicle control data 97 may include data relating to the autonomously braking, accelerating and/or navigating the road, and autonomously controlling the vehicle 12 to brake before or stop before the upcoming intersection or through the upcoming intersection.

It should be understood that the components illustrated in FIGS. 3A-3C are merely illustrative and are not intended to limit the scope of this disclosure. More specifically, while the components in FIGS. 3A-3C are illustrated as residing within the electronic control unit 32 of the vehicle 12, this is a non-limiting example. In some embodiments, one or more of the components may reside external to the electronic control unit 32 and/or the vehicle 12. Similarly, as previously described herein, while FIGS. 3A-3C are directed to the electronic control unit 32 of the vehicle 12, other components such as the user-computing device 16 and the server-computing device 14 may include similar hardware, software, and/or firmware.

Figure 4A:
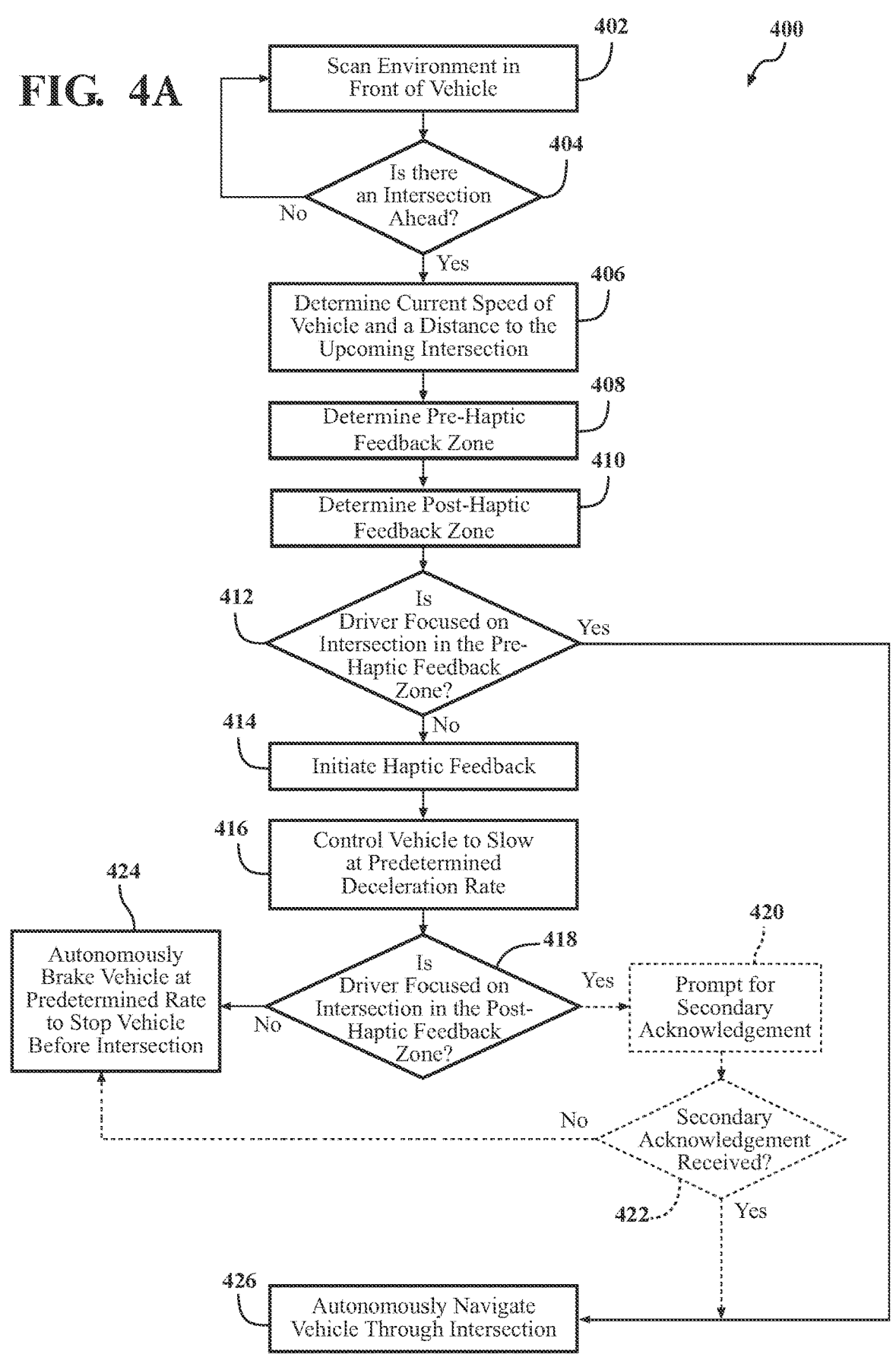
FIG. 4A depicts a flow diagram of an illustrative method of a first aspect of autonomously navigating an upcoming intersection with the intersection driver awareness system according to one or more embodiments shown and described herein.

Referring now to FIG. 4A, a flow diagram that graphically depicts an illustrative method 400 for a first aspect of controlling the vehicle at an intersection is provided. Although the steps associated with the blocks of FIG. 4A will be described as being separate tasks, in other embodiments, the blocks may be combined or omitted and/or performed simultaneously. Further, while the steps associated with the blocks of FIG. 4A will described as being performed in a particular order, in other embodiments, the steps may be performed in a different order.

At block 402, the sensing system of the vehicle scans an environment in front of the vehicle to determine whether there is an upcoming intersection. In some embodiments, only the vehicle scanning is performed. In other embodiments, the vehicle receives data from external devices with the approaching known intersection, such as a map data from the server-computing device, GPS data from the GPS device, and the like, and/or other data transmitted from the server-computing device. In other embodiments, both the vehicle scanning and the data transmitted from the server-computing device may be utilized. Further, other data may be used, such as vehicle-to-vehicle data (V2V) and the like.

At block 404, a determination is made whether there is an upcoming intersection. If there is not an upcoming intersection, then the method 400 continuously loops between blocks 402-404 until there is a determination of an upcoming intersection. When it is determined that there is an upcoming intersection, a current speed of the vehicle and a distance to the upcoming intersection is determined, at block 406. Based on the current speed of the vehicle and the distance between the vehicle and the upcoming intersection, a pre-haptic zone (e.g., a first zone) is determined, at block 408, and a post-haptic zone (e.g., a second zone) is determined, at block 410. The pre-haptic zone and the post-haptic zone may be determined or established as virtual zones prior to the upcoming intersection, based on the distance to the intersection and current vehicle speed, such that the vehicle may be stopped before the intersection when the driver is not alert or paying attention to the upcoming intersection. A length or distance of the pre-haptic zone and the post-haptic zone may be established such that the vehicle may be stopped automatically, or autonomously, prior to the upcoming intersection, and to provide time for the driver to be deemed or otherwise determined to be aware of the upcoming intersection, as discussed in greater detail herein.

When the vehicle enters and/or is traversing the pre-haptic zone, or just before entering the pre-haptic zone, a determination is made regarding whether the driver is focused on the upcoming intersection, at block 412. The image-capturing device, or other sensors of the sensing system, may be utilized to gather data for the determination of whether the driver is focused based on a gaze determination and/or other facial monitoring. If the determination is that the driver is paying attention or is focused for the upcoming intersection in the pre-haptic zone, then the vehicle autonomously navigates through the upcoming intersection, at block 426.

When the determination is that the driver is not focused for the upcoming intersection, at block 412, the haptic feedback is initiated, at block 414. The haptic feedback may be the vibration of the steering wheel and/or seat in a predetermined pattern, such as to mimic traversing rumble strips, as discussed in greater detail above. Other example haptic feedback include audio haptic feedback through the audio system, visual haptic feedback through the display system and/or the like. The haptic feedback is to alert the driver of the upcoming intersection. In some embodiments, more than one type of haptic feedback may be initiated at one time to simultaneously alert the driver. Further, at block 416, the vehicle is autonomously decelerated to slow vehicle prior to the upcoming intersection. The slowing of the vehicle provides for a secondary haptic feedback to alert the driver of the upcoming intersection. Further, other haptic feedback may be also be used such as the audio or visual feedback. The vehicle is continuously slowed at the predetermined deceleration rate until either the vehicle enters the post-haptic zone or the vehicle is traveling at a predetermined minimum speed. The predetermined minimum speed may be based on a speed to enter the upcoming intersection without delaying or causing undesirable traffic conditions and/or at a speed that the vehicle may be stopped prior to the upcoming intersection.

At block 418, another determination is again made regarding whether the driver is now focused on the upcoming intersection following the initiation of the haptic feedback and the slowing of the vehicle at the predetermined deceleration rate. Again, the image-capturing device, or other sensors of the sensing system, may be utilized to gather data for the determination of whether the driver is focused based on a gaze determination and/or other facial monitoring. If the determination at block 418 is that the driver is now paying attention or is now focused for the upcoming intersection, the vehicle autonomously navigates through the upcoming intersection, at block 426. On the other hand, when the determination at block 418 is that the driver is still not paying attention or is not focused for the upcoming intersection, the vehicle is autonomously decelerated at a predetermined deceleration rate to stop the vehicle prior to the intersection, at block 424.

In some embodiments, when the determination at block 418 is that the driver is now paying attention or is now focused for the upcoming intersection following the determination of the failed awareness (e.g., NO at block 412), the driver may be prompted for a secondary acknowledgement, at block 420. The secondary acknowledgement may be the driver manually confirming permission for the vehicle to autonomously proceed through the upcoming intersection. Examples of the confirmation may include, without limitation, the driver pulling the stalk, pressing a button, actuating the accelerator pedal, or the like. As such, following the determination of the failed awareness in the pre-haptic zone (e.g., NO at block 412), and the determination of driver awareness in the post-haptic zone (e.g., YES at block 418), the driver awareness system requires the driver to regain attention and confirm permission via input required by the driver, referred to herein as the secondary acknowledgement.

At block 422, a determination is made whether the secondary acknowledgement is received. When the determination is that the secondary acknowledgement is received, the vehicle autonomously navigates through the upcoming intersection, at block 426. On the other hand, when the determination is that the secondary acknowledgement is not received, the vehicle is autonomously decelerated to stop the vehicle prior to the intersection, at block 424.

Figure 4B:
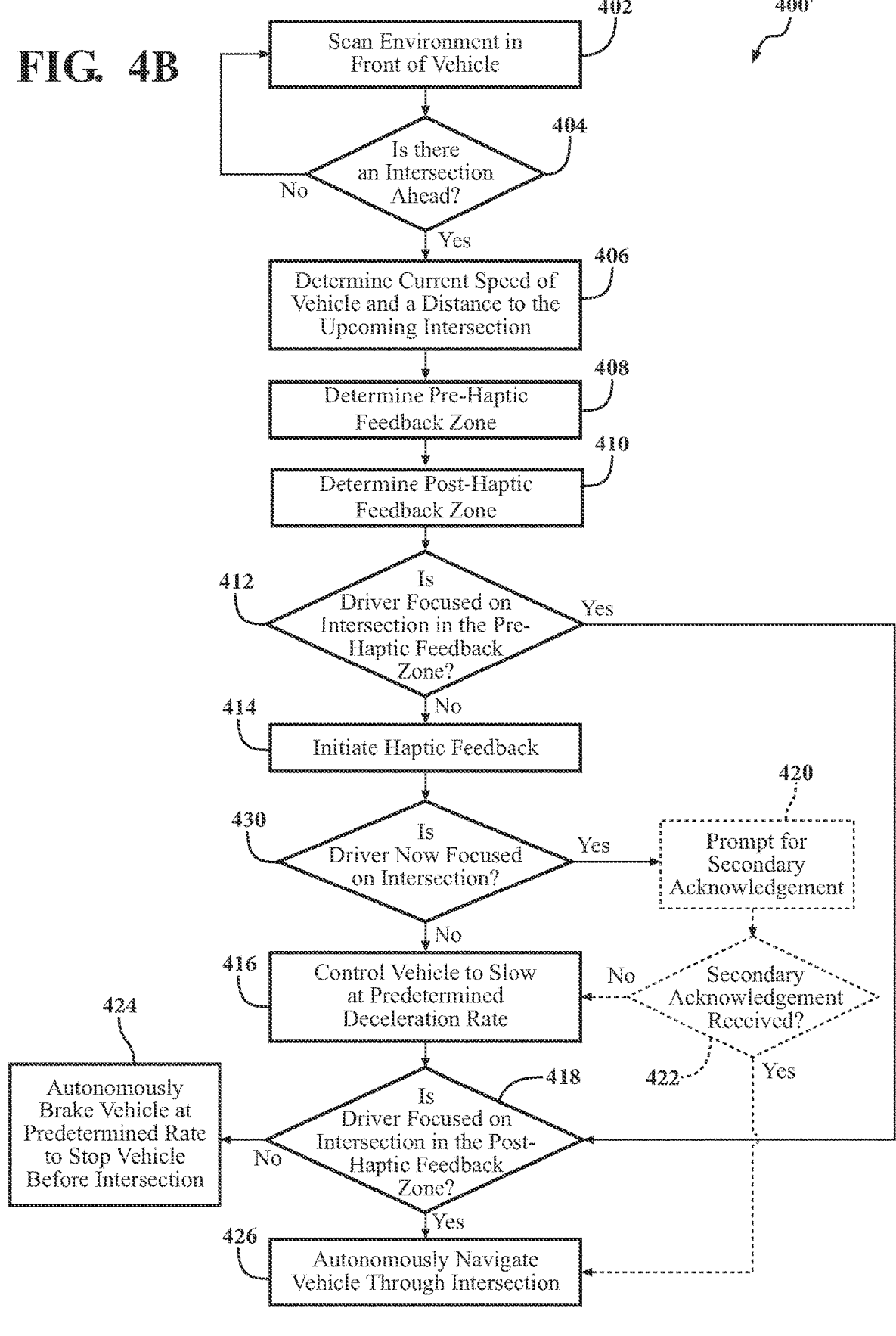
FIG. 4B depicts a flow diagram of an illustrative method of a second aspect of autonomously navigating an upcoming intersection with the intersection driver awareness system according to one or more embodiments shown and described herein.

Referring now to FIG. 4B, a flow diagram that graphically depicts an illustrative method 400' for a second aspect of controlling the vehicle at an intersection is provided. It should be appreciated that the method 400' is similar to the method 400 of FIG. 4A except for the differences described herein. As such, similar reference numerals will be used. Further, although the steps associated with the blocks of FIG. 4B will be described as being separate tasks, in other embodiments, the blocks may be combined or omitted and/or performed simultaneously. Further yet, while the steps associated with the blocks of FIG. 4B will described as being performed in a particular order, in other embodiments, the steps may be performed in a different order.

At block 402, the sensing system of the vehicle scans an environment in front of the vehicle to determine whether there is an upcoming intersection. In some embodiments, only the vehicle scanning is performed. In other embodiments, the vehicle receives data from external devices with the approaching known intersection, such as a map data from the server-computing device, GPS data from the GPS device, and the like, and/or other data transmitted from the server-computing device. In other embodiments, both the vehicle scanning and the data transmitted from the server-computing device may be utilized. Further, other data may be used, such as vehicle-to-vehicle data (V2V) and the like.

At block 404, a determination is made whether there is an upcoming intersection. If there is not an upcoming intersection, then the method 400' continuously loops between blocks 402-404 until there is a determination of an upcoming intersection. When it is determined that there is an upcoming intersection, a current speed of the vehicle and a distance to the upcoming intersection is determined, at block 406. Based on the current speed of the vehicle and the distance between the vehicle and the upcoming intersection, a pre-haptic zone is determined, at block 408, and a post-haptic zone is determined, at block 410.

When the vehicle enters and/or is traversing the pre-haptic zone, or just before entering the pre-haptic zone, a determination is made regarding whether the driver is focused on the upcoming intersection, at block 412. The image-capturing device, or other sensors of the sensing system, may be utilized to gather data for the determination of whether the driver is focused based on a gaze determination and/or other facial monitoring. If the determination is that the driver is paying attention or is focused for the upcoming intersection in the pre-haptic zone, then the vehicle autonomously navigates to the post-haptic zone. At block 418, another determination is made regarding whether the driver is still focused on the upcoming intersection in the post-haptic zone. Again, the image-capturing device, or other sensors of the sensing system, may be utilized to gather data for the determination of whether the driver is focused based on a gaze determination and/or other facial monitoring. If the determination at block 418 is that the driver is still paying attention or focused for the upcoming intersection, the vehicle autonomously navigates through the upcoming intersection, at block 426. On the other hand, when the determination at block 418 is that the driver is now not paying attention or is not focused for the upcoming intersection, the vehicle is autonomously decelerated to stop the vehicle prior to the intersection, at block 424. As such, it should be appreciated that the pre-haptic zone and post haptic zone in the method 400' may differ from those in method 400 discussed with respect to FIG. 4A such that there is enough distance to stop the vehicle before the upcoming intersection following a determined of a failed awareness in the post-haptic zone.

When the determination is that the driver is not focused for the upcoming intersection, at block 412, the haptic feedback is initiated, at block 414. The haptic feedback may be the vibration of the steering wheel and/or seat in a predetermined pattern, such as to mimic traversing rumble strips, as discussed in greater detail above. Other example haptic feedback include audio haptic feedback through the audio system, visual haptic feedback through the display system and/or the like. The haptic feedback is to alert the driver of the upcoming intersection. In some embodiments, more than one type of haptic feedback may be initiated at one time to simultaneously alert the driver.

At block 430, a determination is made regarding whether the driver is now focused on the upcoming intersection. The image-capturing device, or other sensors of the sensing system, may be utilized to gather data for the determination of whether the driver is focused based on a gaze determination and/or other facial monitoring. If the determination is that the driver is paying attention or is focused for the upcoming intersection, then the vehicle autonomously navigates through the upcoming intersection, at block 426. On the other hand, when the determination is that the driver is not focused or aware of the upcoming intersection at block 430, the vehicle is autonomously decelerated to slow vehicle prior to the upcoming intersection at block 416. The slowing of the vehicle provides for a secondary haptic feedback to alert the driver of the upcoming intersection. Further, other haptic feedback may be also be used such as the audio or visual feedback. The vehicle is continuously slowed at the predetermined deceleration rate until either the vehicle enters the post-haptic zone or the vehicle is traveling at a predetermined minimum speed. The predetermined minimum speed may be based on a speed to enter the upcoming intersection without delaying or causing undesirable traffic conditions and/or at a speed that the vehicle may be stopped prior to the upcoming intersection.

After the continuously slowing of the vehicle at the predetermined deceleration rate into the post-haptic zone, another determination is again made regarding whether the driver is now focused on the upcoming intersection, at block 418, following the initiation of the haptic feedback and the slowing of the vehicle at the predetermined deceleration rate. Again, the image-capturing device, or other sensors of the sensing system, may be utilized to gather data for the determination of whether the driver is focused based on a gaze determination and/or other facial monitoring. If the determination at block 418 is that the driver is now paying attention or is now focused for the upcoming intersection, the vehicle autonomously navigates through the upcoming intersection, at block 426. On the other hand, when the determination at block 418 is that the driver is still not paying attention or is not focused for the upcoming intersection, the vehicle is autonomously decelerated to stop the vehicle prior to the intersection, at block 424.

In some embodiments, when the determination at block 430 is that the driver is now paying attention or is now focused for the upcoming intersection following the determination of the failed awareness (e.g., NO at block 412) and the initiation of the haptic feedback at block 414, the driver may be prompted for a secondary acknowledgement, at block 420. The secondary acknowledgement may be a driver manually confirming permission for the vehicle to autonomously proceed through the upcoming intersection. Examples may include, without limitation, the driver pulling the stalk, pressing a button, actuating the accelerator pedal, or the like. As such, following the determination of the failed awareness in the pre-haptic zone (e.g., NO at block 412), and the determination of driver awareness in the post-haptic zone (e.g., YES at block 430), the driver awareness system requires the driver to regain attention and confirm permission via a manually input required by the driver, referred to herein as the secondary acknowledgement. At block 422, a determination is made whether the secondary acknowledgement is received. When the determination is that the secondary acknowledgement is received, the vehicle autonomously navigates through the upcoming intersection, at block 426.

On the other hand, when the determination is that the secondary acknowledgement is not received, the vehicle is autonomously decelerated at the predetermined deceleration rate, at block 416. The slowing of the vehicle provides for a secondary haptic feedback to alert the driver of the upcoming intersection. Further, other haptic feedback may be also be used such as the audio or visual feedback. The vehicle is continuously slowed at the predetermined deceleration rate until either the vehicle enters the post-haptic zone or the vehicle is traveling at a predetermined minimum speed. The predetermined minimum speed may be based on a speed to enter the upcoming intersection without delaying or causing undesirable traffic conditions and/or at a speed that the vehicle may be stopped prior to the upcoming intersection.

At block 418, another determination is again made regarding whether the driver is now focused on the upcoming intersection following the initiation of the haptic feedback and the slowing of the vehicle at the predetermined deceleration rate. Again, the image-capturing device, or other sensors of the sensing system, may be utilized to gather data for the determination of whether the driver is focused based on a gaze determination and/or other facial monitoring. If the determination at block 418 is that the driver is now paying attention or is now focused for the upcoming intersection, the vehicle autonomously navigates through the upcoming intersection, at block 426. On the other hand, when the determination at block 418 is that the driver is still not paying attention or is not focused for the upcoming intersection, the vehicle is autonomously decelerated at a predetermined deceleration rate to stop the vehicle prior to the intersection, at block 424.

It should be understood that in this embodiment, the driver may be prompted for another secondary acknowledgement, at block 420 following the determination that the driver is now aware and focused om the upcoming intersection, at block 418. As before, the secondary acknowledgement may be a driver manually confirming permission for the vehicle to autonomously proceed through the upcoming intersection. Examples may include, without limitation, the driver pulling the stalk, pressing a button, actuating the accelerator pedal, or the like. As such, following the determination of the failed awareness in the pre-haptic zone (e.g., NO at block 412), and a second failed awareness (e.g., NO at block 430) or passed awareness (e.g., YES at block 430), but failed secondary acknowledgment (e.g., NO at block 422), the driver awareness system may require the driver to regain attention and confirm permission via a manually input required by the driver. As such, a determination is made whether the secondary acknowledgement is received. When the determination is that the secondary acknowledgement is received, the vehicle autonomously navigates through the upcoming intersection, at block 426. On the other hand, when the determination is that the secondary acknowledgement is not received, the vehicle is autonomously decelerated at a predetermined deceleration rate to stop the vehicle prior to the intersection, at block 424.

As such, it should be appreciated that the secondary acknowledgement may be included in the method 400' after any determination to include the automated determination that the driver has regain attention/focus of the upcoming intersection and the driver has confirmed permission for the vehicle to autonomously proceed through the intersection.

Figures 5A, 5B, 5C:
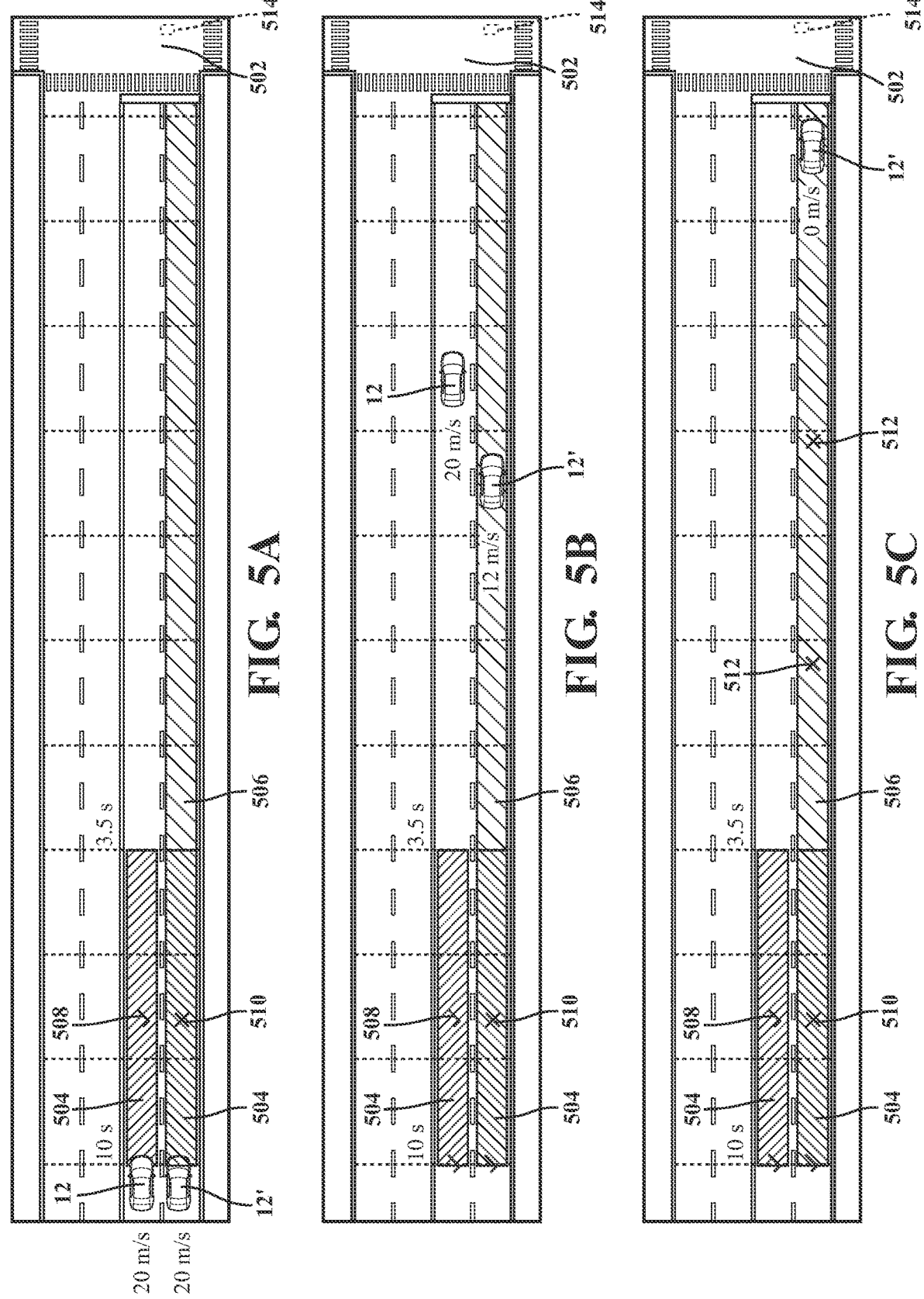
FIG. 5A schematically depicts an example plan top view of a vehicle approaching an upcoming intersection according to one or more embodiments shown and described herein.
FIG. 5B schematically depicts the example plan top view of the vehicle approaching the upcoming intersection of FIG. 5A where one example driver is determined to be focused on the intersection and the other example driver is determined to not be focused and the intersection driver awareness system has autonomously slowed the vehicle according to one or more embodiments shown and described herein.
FIG. 5C schematically depicts the example plan top view of the vehicle approaching the upcoming intersection of FIG. 5B where the one example driver determined to be focused on the intersection traverses the intersection and the other example driver determined to not be focused by the intersection driver awareness system is stopped before the intersection according to one or more embodiments shown and described herein.

Now referring to FIGS. 5A-5C, an example plan top view of a vehicle approaching an upcoming intersection is schematically depicted. It should be appreciated that the vehicle 12 and a vehicle 12' are depicted, which are identical, but for illustrative purposes, the driver 40 (FIG. 2) will have different awareness or focus determinations in each vehicle to further illustrate some of the embodiments of the intersection driver awareness system 1, as discussed in greater detail above.

With reference to FIG. 5A, an upcoming intersection 502 is determined and the pre-haptic zone 504 and the post-haptic zone 506 are determined. The pre-haptic zone 504 and the post-haptic zone 506 are determined based on the current speed of the vehicles 12, 12' and the distance to the upcoming intersection 502, as discussed in greater detail above. Also, as illustrated in the upcoming intersection 502 is a traffic control device 514. In the depicted example, the traffic control device 514 is a traffic light with a greenlight. This is non-limiting and the traffic control device may be a stop sign, yield sign, no device, and the like. As illustrated, in the pre-haptic zone 504, the driver of the vehicle 12 is determined to be focused on the upcoming intersection 502, illustrated by the check mark with reference number 508. Conversely, the driver of the vehicle 12' is determined to not be focused on the upcoming intersection 502 in the pre-haptic zone 504, illustrated by the "X" with reference number 510.

With reference to FIG. 5B, the vehicle 12 is permitted to continue to travel without the haptic feedback because the driver was determined to be focused on the upcoming intersection 502. Conversely, because the driver of the vehicle 12' was determined to not be focused on the upcoming intersection 502 in the pre-haptic zone 504 and/or following the haptic feedback, the vehicle 12' is autonomously slowed at the predetermined deceleration rate to generate a second haptic feedback prior to and/or within the post-haptic zone 506.

With reference to FIG. 5C, the vehicle 12 has autonomously navigated the upcoming intersection 502. Conversely, the driver of the vehicle 12' was determined to still not be focused on the upcoming intersection 502 in the post-haptic zone 506 following the second haptic feedback (e.g., the autonomous slowing of the vehicle 12') illustrated by the "X" with reference numeral 512. As a result, the vehicle 12' is autonomously slowed to brake or stop prior to the upcoming intersection 502, and will not autonomously navigate the upcoming intersection 502 requiring the driver to manually navigate the upcoming intersection 502.

Now referring to FIGS. 6A-6D, another example plan top view of a vehicle approaching an upcoming intersection is schematically depicted. It should be appreciated that the example plan top view of the vehicle approaching the upcoming intersection depicted in FIGS. 6A-6D is similar to the FIGS. 5A-5C and, as such, like reference numerals will be continued. It should be appreciated that the vehicle 12 and a vehicle 12' are depicted, which are identical, but for illustrative purposes, the driver of each vehicle 12, 12' will have different awareness or focus determinations at different positions approaching the upcoming intersection 502 to further illustrate embodiments of the intersection driver awareness system 1, as discussed in greater detail above.

Figure 6A:
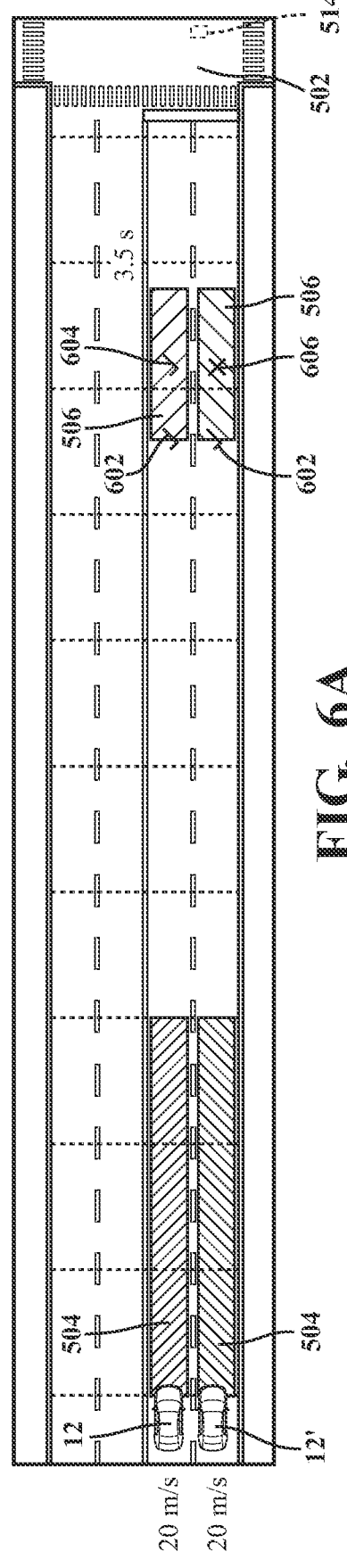
FIG. 6A schematically depicts an example plan top view of a vehicle approaching an upcoming intersection in which both drivers are determined to not be paying attention in a pre-haptic zone to the upcoming intersection according to one or more embodiments shown and described herein.

With reference to FIG. 6A, an upcoming intersection 502 is determined and the pre-haptic zone 504 and the post-haptic zone 506 are determined. The pre-haptic zone 504 and the post-haptic zone 506 are determined based on the current speed of the vehicle and the distance to the upcoming intersection 502, with a greenlight as a traffic control device 514, as discussed in greater detail above. As illustrated, both vehicles 12, 12' are traveling at the same speed when entering the pre-haptic zone 504. Further, in this example hypothetical, the driver of vehicles 12, 12' will be determined to not paying attention in the pre-haptic zone illustrated by the "X" given reference numeral 510 (FIG. 6B), the driver of vehicle 12 is determined to be paying attention following the haptic feedback when the vehicle 12 now enters the post-haptic zone 506, illustrated by the check mark given reference numeral 602 and, optionally, the driver of vehicle 12 is determined to be paying attention while traversing the post-haptic zone 506, illustrated by the check mark given reference numeral 604. Conversely, in this example hypothetical, the driver of vehicle 12' is determined to be paying attention following the haptic feedback when the vehicle 12 now enters the post-haptic zone 506, illustrated by the check mark given reference numeral 602 and, optionally, the driver of vehicle 12' is then determined to be not paying attention while traversing the post-haptic zone 506, illustrated by the "X" given reference numeral 606.

Figure 6B:
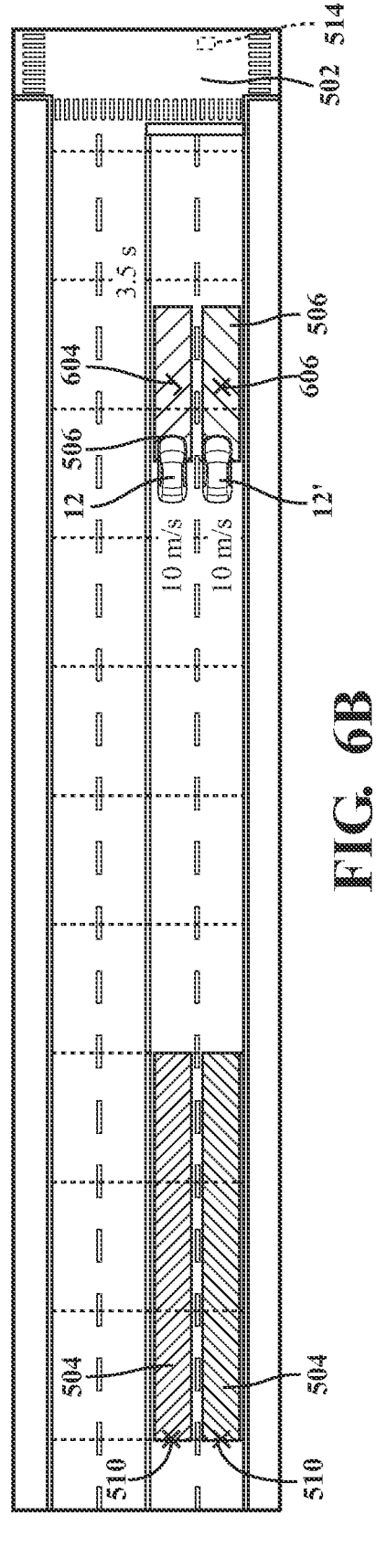
FIG. 6B schematically depicts the example plan top view of the vehicle approaching the upcoming intersection of FIG. 6A where both vehicles are slowed and entering a post-haptic zone according to one or more embodiments shown and described herein.

With reference to FIG. 6B, because both drivers of the vehicles 12, 12' are determined to not be paying attention, both are subjected to the haptic feedback and to a predetermined deceleration rate, illustrated by the speed of each of the vehicles 12, 12' reduced in half to 10 m/s. It should be understood that this is merely illustrative for this example, and the starting speed, the reduced speed and the like be any speed. As such the 10 m/s is non-limiting and is for example purposes only.

Figure 6C:
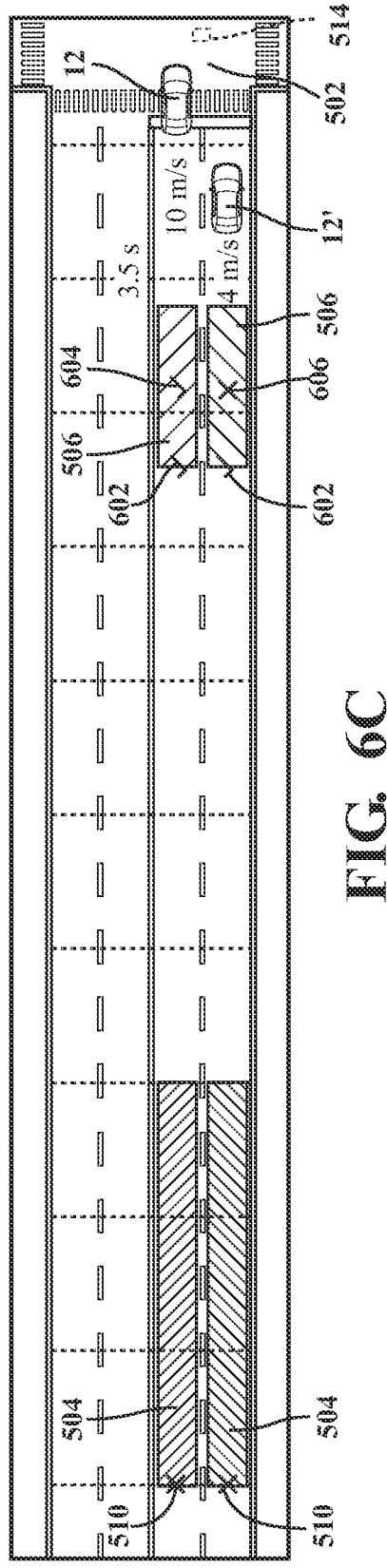
FIG. 6C schematically depicts the example plan top view of the vehicle approaching the upcoming intersection of FIG. 6B where one example driver is determined to be focused on the intersection in the post-haptic zone and the other example driver is determined to not be focused on the intersection in the post-haptic zone and the intersection driver awareness system has autonomously slowed the vehicle according to one or more embodiments shown and described herein.

With reference to FIG. 6C, because the driver of the vehicle 12 was determined to be focused on the upcoming intersection 502 at both checkpoints in the post-haptic zone 506, the vehicle 12 is not subject to further deceleration and may enter the upcoming intersection 502 autonomously. Conversely, because the driver of the vehicle 12' was determined to not be focused on the upcoming intersection 502 in the post-haptic zone 506, the vehicle 12' is autonomously slowed at the predetermined deceleration rate within and following the post-haptic zone 506 to stop the vehicle before the upcoming intersection 502.

Figure 6D:
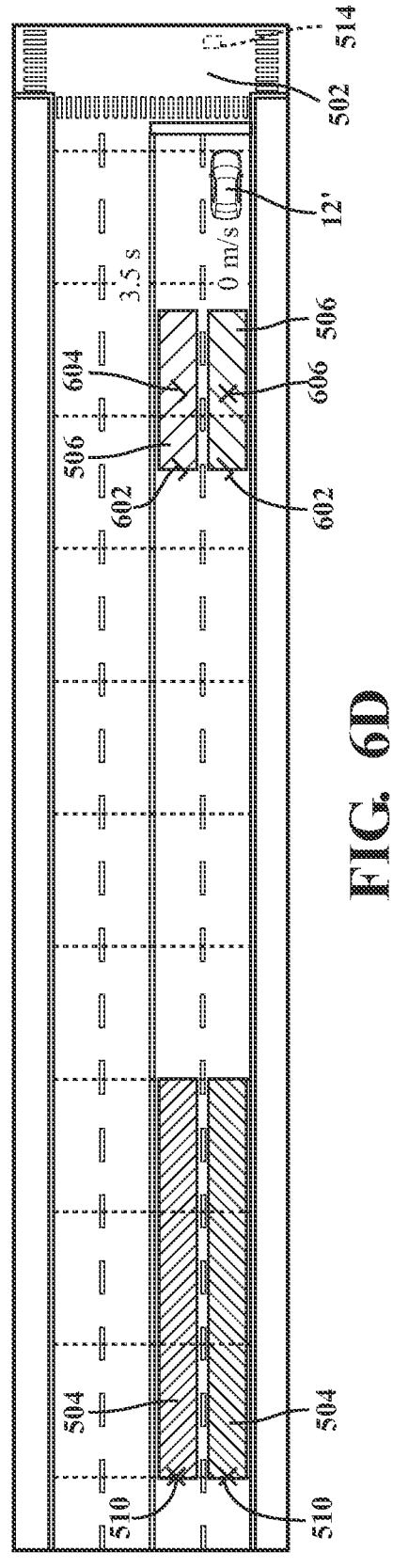
FIG. 6D schematically depicts the example plan top view of the vehicle approaching the upcoming intersection of FIG. 6C where the one example driver determined to be focused on the intersection in the post-haptic zone now traverses the intersection and the other example driver determined to not be focused by the intersection driver awareness system in the post-haptic zone is stopped before the intersection according to one or more embodiments shown and described herein.

With reference to FIG. 6D, the vehicle 12 has autonomously navigated the upcoming intersection 502. Conversely, the vehicle 12' is autonomously slowed to brake or stop prior to the upcoming intersection 502, and will not autonomously navigate the upcoming intersection 502 requiring the driver to manually navigate the intersection.

It should now be understood that the systems methods, and vehicle components described herein may be directed to an autonomous vehicle that includes an intersection driver awareness system that is configured to provide haptic feedback to a driver at certain periods prior to the vehicle entering the intersection and/or determining whether the driver is focused on the intersection and prepared for manual takeover of the vehicle. Example haptic feedback include vibrating the steering wheel or seat in a pattern, such as rumble strips. The haptic feedback is to alert the driver of the upcoming intersection. The placement of the zones may be based on the current speed of the vehicle and the distance to the intersection. If the driver is not paying attention in a pre-haptic zone, the vehicle is autonomously slowed down at a predetermined deceleration rate, which is at enough of a deceleration rate to prompt the driver to pay attention, but not enough to cause discomfort for the driver or create issues for vehicles trailing the vehicle. A post-haptic zone may be established to determine whether the driver is now paying attention when the driver was not paying attention in the pre-haptic zone, even after feeling the effects of the rumble strips. This post-haptic zone allows the driver to recover following the pre-haptic zone. When the driver recovers (i.e., the intersection driver awareness system determines that the driver is now paying attention), the vehicle autonomously travels through the intersection at a slower speed. However, if the intersection driver awareness system determines that the driver is still not paying attention, the vehicle autonomously stops prior to the intersection and requires manual intervention to proceed through the intersection.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system of controlling a vehicle through an intersection, the system comprising:
   a server-computing device configured to provide a map data to the vehicle indicative of positioning of the intersection;
   a sensing system; and
   an electronic control unit communicatively coupled to the sensing system, the electronic control unit having at least one processing device and a memory device coupled to the at least one processing device, the memory device stores logic that, when executed by the at least one processing device, causes the electronic control unit to:
      produce a haptic feedback at a first zone prior to the intersection and slow the vehicle down at a predetermined deceleration rate when the sensing system indicates a driver is not paying attention to the intersection;
      autonomously navigate the intersection if the driver is determined to be paying attention in a second zone when the driver was not paying attention in the first zone, the second zone is prior to the intersection; and
      autonomously stop the vehicle when the driver was not paying attention in the second zone after not paying attention in the first zone.

2. The system of claim 1, wherein the sensing system is configured for a facial monitoring of the driver.

3. The system of claim 1, wherein the predetermined deceleration rate is based on a current speed of the vehicle.

4. The system of claim 3, wherein the predetermined deceleration rate provides for a second haptic feedback to the driver.

5. The system of claim 3, wherein the predetermined deceleration rate is no more than 3 m/s$^2$.

6. The system of claim 1, wherein the haptic feedback is a vibration of a steering wheel of the vehicle.

7. The system of claim 1, wherein the haptic feedback is a vibration of a seat of the vehicle.

8. The system of claim 1, wherein the vehicle is stopped prior to the intersection when the driver was not paying attention in the second zone after not paying attention in the first zone.

9. The system of claim 1, wherein the first zone and the second zone are established based on a current speed of the vehicle and a distance to the intersection.

10. The system of claim 1, wherein the first zone and the second zone are further established based on whether there is a green traffic light present.

11. A method of controlling a vehicle through an intersection, the method comprising:

determining a first zone prior to the intersection;

determining a second zone positioned after the first zone and prior to the intersection;

determining whether a driver is paying attention to the intersection when the vehicle is in the first zone;

in response to determining that the driver is not paying attention to the intersection when the vehicle is in the first zone, producing a haptic feedback and slowing the vehicle down at a predetermined deceleration rate in the second zone;

determining whether the driver is paying attention to the intersection following the haptic feedback;

autonomously stop the vehicle when the driver was not paying attention in the second zone after not paying attention in the first zone; and autonomously navigate the intersection when the driver is determined to be paying attention in the second zone when the driver was not paying attention in the first zone.

12. The method of claim 11, wherein the determination of whether the driver is paying attention is via a sensing system configured for a facial monitoring of the driver.

13. The method of claim 11, wherein the predetermined deceleration rate is based on a current speed of the vehicle and a distance to the intersection.

14. The method of claim 13, wherein the predetermined deceleration rate provides for a second haptic feedback to the driver.

15. The method of claim 11, wherein the first zone and the second zone are based on a current speed of the vehicle and a distance to the intersection.

16. The method of claim 11, wherein the haptic feedback is a vibration of a steering wheel of the vehicle in a predetermined pattern.

17. The method of claim 16, wherein the predetermined pattern mimics traversing a rumble strip.

18. The method of claim 11, wherein the vehicle is stopped prior to the intersection when the driver was not paying attention in the second zone after not paying attention in the first zone.

19. An autonomous vehicle comprising:

a sensing system; and an electronic control unit communicatively coupled to the sensing system, the electronic control unit having at least one processing device and a memory device coupled to the at least one processing device, the memory device stores logic that, when executed by the at least one processing device, causes the electronic control unit to:

determine a first zone prior to an intersection;

determine a second zone positioned after the first zone and prior to the intersection;

determine whether a driver is driver is paying attention to the intersection;

in response to the determination that the driver is not paying attention, produce a haptic feedback at the first zone prior to the intersection and slow the autonomous vehicle down at a predetermined deceleration rate;

determine whether the driver is now paying attention to the intersection;

autonomously navigate the intersection if the driver is determined to now be paying attention in the second zone when the driver was not paying attention in the first zone; and autonomously stop the autonomous vehicle when the driver was not paying attention in the second zone after not paying attention in the first zone.

20. The autonomous vehicle of claim 19, wherein the sensing system is configured for a facial monitoring of the driver.

* * * * *